(12) United States Patent
Mills et al.

(10) Patent No.: US 6,869,987 B2
(45) Date of Patent: *Mar. 22, 2005

(54) CEMENTITIOUS COMPOSITIONS AND A METHOD OF THEIR USE

(75) Inventors: Peter Shelley Mills, Stamping Ground, KY (US); David Neil Degville, Lexington, KY (US); Aj Rohaly, York, PA (US)

(73) Assignee: Minova International Limited, Witney (GB)

( * ) Notice: Subject to any disclaimer, the term of this patent is extended or adjusted under 35 U.S.C. 154(b) by 78 days.

This patent is subject to a terminal disclaimer.

(21) Appl. No.: 10/095,099

(22) Filed: Mar. 12, 2002

(65) Prior Publication Data

US 2002/0161071 A1 Oct. 31, 2002

Related U.S. Application Data

(63) Continuation of application No. PCT/GB00/04010, filed on Oct. 19, 2000.
(60) Provisional application No. 60/160,163, filed on Oct. 19, 1999.

(51) Int. Cl.$^7$ ............................................... C04B 24/24
(52) U.S. Cl. ..................... 524/2; 524/3; 524/4; 524/5; 524/6; 524/7; 524/8
(58) Field of Search ........................................ 524/2–8

(56) References Cited

U.S. PATENT DOCUMENTS 4,455,171 A * 6/1984 Spensley et al. ............. 106/694
2002/0157576 A1 * 10/2002 Mills et al. .................. 106/724

FOREIGN PATENT DOCUMENTS

| DE | 25 34 564 A | 2/1977 |
| DE | 33 02 440 C | 10/1983 |
| WO | WO 98/58886 | 12/1998 |
| WO | WO 02/083593 | * 10/2003 |

OTHER PUBLICATIONS

Chemical Abstracts, vol. 104, No. 24, Jun. 16, 1986; Takada et al: "Mortar compositions" abstract & JP 61 040862, Feb. 27, 1986.

Chemical Abstracts, vol. 117, No. 8, Aug. 24, 19962; Sasagawa: "rapid–setting, low–shrinkage mortar compositions", & JP 04 077340 A, Mar. 11, 1992.

Database WIP, Section Ch, Week 198539, Derwent Publications Ltd., London, GB & JP 60 158269, Aug. 19, 1985.

* cited by examiner

*Primary Examiner*—Peter Szekely
(74) *Attorney, Agent, or Firm*—Nixon & Vanderhye P.C.

(57) ABSTRACT

A settable composition which can be applied by spraying to form a coating on a surface such as the walls of a mine comprises (i) a cementitious composition comprising the following components: (a) from 25 to 95% of calcium aluminate, (b) from 0 to 10% of lien and (c) from 0 to 50% of calcium sulphate, and where the sum of (b) and (c) is at least 5% the % being by weight based on the combined weight of (a), (b) and (c) and where the proportions of the components are such that the composition on hydration is capable of absorbing at least its own weight of water and (ii) an aqueous emulsion of an organic polymer, the amount of (ii) in relation to (i) being such as to provide a weight ratio of polymer, expressed as solids, to combined weight of (a), (b) and (c) of from 0.5:1 to 10:1, preferably 1:1 to 2.5:1 or (iii) a dispersible organic polymer and where the amount of dispersible polymer is such as to give a weight ratio of polymer to combined weight of (a), (b) and (c) o from 0.5:1 to 10:1, preferably 1:1 to 2.5:1. The dry composition parts (i) and (iii) above can be mixed with water in the mine.

18 Claims, 1 Drawing Sheet

US 6,869,987 B2

CEMENTITIOUS COMPOSITIONS AND A METHOD OF THEIR USE

CROSS REFERENCE TO RELATED APPLICATION

Figure 1:
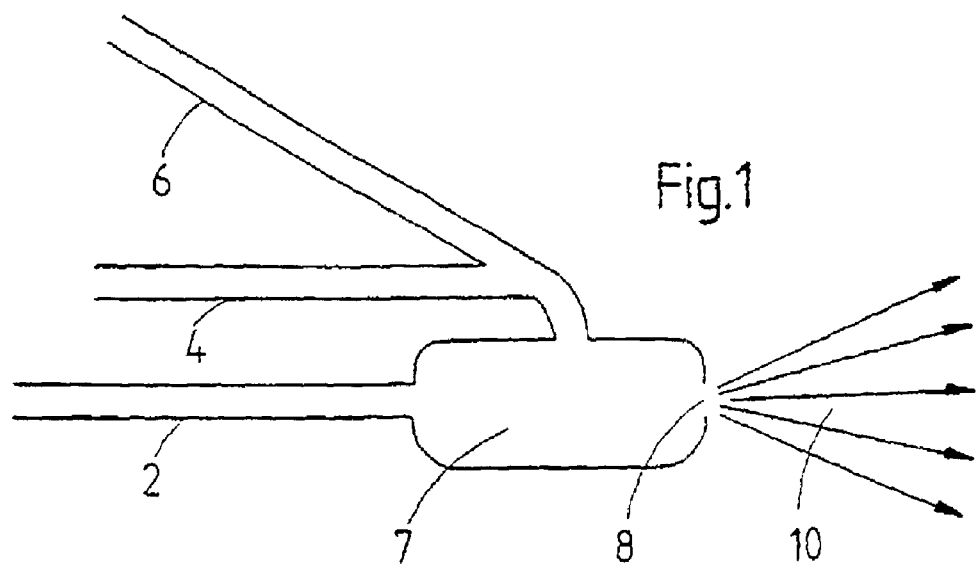

This is a continuation of PCT application No. PCT/GB00/04010, filed Oct. 19, 2000 and claims priority from U.S. Provisional Patent Application No. 60/160,163 filed on Oct. 19, 1999, the entire content of which is hereby incorporated by reference in this application.

FIELD OF THE INVENTION

This invention relates to materials suitable for use in coating surfaces in particular the surfaces of rock and to a method for the treatment of surfaces employing, the materials of the invention.

BACKGROUND OF THE INVENTION

It has been previously proposed to apply a coating to a rock surface in a mine by spraying an aqueous emulsion of an organic polymer and causing the emulsion to coagulate to produce a flexible coating in the form of a film or skin on the surface.

Polymers which have been disclosed for this purpose include polyurethanes and polychloroprene. The latter has been described in South African Patent No 8203384.

More recently there has been described in WO 98/58886 a composition comprising two parts. One is an aqueous emulsion of an organic polymer such as the copolymer of ethylene and vinyl acetate. The other part is a cementitious composition capable of absorbing at least its own weight of water. The cementitious composition described is an ettringite-forming composition containing high alumina cement, ordinary Portland cement and anhydrite. In use the two parts are sprayed onto a rock surface of a mine to form a coating. This patent also discloses a dry mixture of solids formed from the cementitious composition and a dried polymer emulsion to which mixture water is added in the mine.

PROBLEM TO BE SOLVED BY THE INVENTION

Compositions described in the above mentioned WO98/58886 take a significant time to reach an adequate early strength, typically not less than 24 hours. Whilst the coating is developing its strength, for safety reasons personnel are not admitted to the treated area and that part of the mine is therefore not productive. It is very desirable therefore to reduce the time taken by the coating to develop an adequate early strength.

The present invention provides a solution to this problem by providing an Ettringite-forming cementitious composition richer in calcium aluminate than those described above and which gives a higher early strength.

SUMMARY OF THE INVENTION

According to the present invention there is provided a settable composition comprising
(i) a cementitious composition comprising the following components:
(a) from 25 to 95% of calcium aluminate
(b) from 0 to 10% of lime and
(c) from 0 to 50% of calcium sulphate, and where the sum of (b) and (c) is at least 5%
the % being by weight based on the combined weight of (a), (b) and (c) and where the proportions of the components are such that the composition on hydration is capable of absorbing at least its own weight of water and (ii) an aqueous emulsion of an organic polymer, the amount of (ii) in relation to (i) being such as to provide a weight ratio of polymer solids to combined weight of (a), (b)) and (c) of from 0.5:1 to 10:1, preferably 1:1 to 2.5:1 or (iii) an organic polymer in the form of a powder dispersible in water and where the amount of organic polymer is such as to give a weight ratio of polymer to combined weight of (a), (b) and (c) of from 0.5:1 to 10:1, preferably 1:1 to 2.5:1.

ADVANTAGEOUS EFFECT OF THE INVENTION

The advantage of employing the calcium aluminate—containing composition defined above is that it enables a higher early strength to be achieved. One of the uses of the composition is as a replacement for welded wire mesh and this advantage enables the support characteristics of welded wire mesh to be reached quicker.

DETAILED DESCRIPTION OF THE INVENTION

The term calcium aluminate is intended to include not only the form of calcium aluminate which is often written in cement notation as CA but also other aluminate-containing cements which are written as $CA_2.C_3A.C_{12}A_7.C_4AF$ and $C_{11}A_7.CaF_2$ and in addition calcium sulphoaluminate and calcium ferroaluminate and analogues thereof.

The calcium aluminate may be provided by high alumina cement, sometimes referred to as Ciment Fondu which normally contains about 40 to 80% by weight of calcium aluminate phases (or 40 to 50% of calcium aluminate(CA)). The lime may be quick lime (CaO) or hydrated lime (Ca(OH)$_2$) or may be provided by ordinary Portland cement which releases lime on hydration. The calcium sulphate may be provided by a calcium sulphate-containing material such as beta-anhydrite, gypsum, or plaster of Paris.

References to calcium sulphoaluminate in the specification are to pure calcium sulphoaluminate which is of the formula $C_4A_3S^*$ where C is CaO, A is $Al_2O_3$ and $S^*$ is $SO_3$. This is sometimes known as Klein's compound and may also be written as $3CaO.3Al_2O_3.CaSO_4$ Ettringite is a calcium trisulphoaluminate having 32 molecules of water of crystallization and has the formula $3CaO.Al_2O_3.3CaSO_4.32H_2O$. Ettringite is produced by the hydration of cementitious materials containing calcium aluminate and calcium sulphate.

To increase the amount of ettringite it is preferred to include calcium oxide and/or calcium hydroxide which may be provided by ordinary Portland cement to ensure that $3CaO.Al_2O_3$ is present in sufficient amount to form Ettringite during the hydration.

Unless the context requires otherwise, the term ettringite in the present specification is intended to include ettringite analogues. These are defined in Cement Chemistry by H. F. W. Taylor 2nd edition 1997 published by Thomas Telford.

The preparation of Ettringite containing compositions is described in GB Patent No. 2,123,808 which describes cement compositions that are capable of absorbing at least 2.5 parts by weight of water per part of solids and even as high as 5:1 without the free water separating out.

The formation of ettringite containing compositions is also described in European Patent No.286396 which discloses its formation from mixtures containing high alumina cement and calcium sulphate where the addition of a water soluble fluoride causes the composition to set rapidly and develop high early strength even when the composition is mixed with water at a high water:solids weight ratio.

By high alumina cement we mean any cement which falls within the definition of a high alumina cement according to British Standard 915 Part 2 i.e. a cement which contains not less than 32% by weight of alumina and has an alumina to calcium oxide ratio of between 0.85 and 1:3:1 Suitable cements are Lafarge Fondu cement described in GB Patent No. 1,505,417 and a typical analysis of such a cement is by weight:

38.5% calcium oxide,
39.0% alumina,
16.5% ferric oxide and
4.0% silica.

The term mine in the present specification is intended to include all underground workings including tunnels and quarries.

The invention has application in the construction industry for the treatment of buildings including internal and exterior walls, floors and ceilings.

When used for support in a mine, for example as a substitute for steel mesh, the product is a flexible coating on the rock surface. By flexible is meant the ability of the coating to deform and allow pieces of rock to move and retain the ability to take load.

The aqueous emulsion of organic polymer which is sometimes referred to in the art as a polymer latex emulsion may contain as the polymer one or more of a wide range of homopolymers or copolymers of ethylenically unsaturated monomers or naturally occurring polymers. Examples include styrene, styrene butadiene copolymers, divinyl styrene, methyl methacrylate, copolymers of styrene and methyl methacrylate or maleic anhydride, acrylic and acrylic ester resins, vinyl acetate and copolymers thereof with ethylene and other olefins (eg ethylene vinyl acetate), plasticised vinyl chloride copolymers. Suitable polymers are disclosed in U.S. Pat. No. 4,849,018 which are hereby incorporated by reference. Mixture of polymers or copolymers may be used.

It is preferred to employ a polymer with a glass transition temperature, written as $T_g$, of from −50° C. to 50° C. more preferably from −10° C. to 10° C.

Plasticisers such as Cereclor (a chlorinated paraffin), dibutyl phthalate and diethyleneglycol can be added to improve flexibility.

Suitable polymer solids contents of the emulsion are from 5 to 80%, preferably at least 25% e.g. from 30 to 70%, more preferably 45 to 65% by weight based on the weight of the emulsion.

The dispersible organic polymer is conveniently obtained by drying e.g. spray drying an aqueous polymer emulsion. The dried polymers are available commercially.

According to another aspect of the present invention a method for coating a surface such as a rock surface comprises spraying onto the surface (a) a settable composition comprising the cementitious composition (i) and the aqueous emulsion of organic polymer (ii) as defined above or (b) a settable composition comprising the cementitious composition (i) and the dried polymer (iii) as defined above to which water has been added and continuing the spraying to form a coating on the surface at least 2 mm in thickness and allowing the coating to set.

When the organic polymer emulsion (ii) is used the water may be the water already present in the emulsion (ii) whereby the water of the aqueous emulsion is used to hydrate the cement components. If required or preferred additional water may be added.

When the dried polymer emulsion (iii) is used with the cementitious composition (i) it is necessary to add the water required to hydrate the cement components.

Whether using the emulsion or the dried polymer emulsion the weight of water is preferably at least 50% by weight of the cementitious composition (i). more preferably at least 70% or 90%. Amounts of water greater than the weight of the cementitious composition (i) may be used for example, up to two, three or even five times.

Preferably the pH is controlled by adjusting the amount of alkali/acid to thereby adjust the setting time. Other cement accelerators or retarders may be added. When it is desired to initiate or increase the rate of setting this can be effected by the addition of an alkali. This addition can conveniently be done at or near the nozzle when the mixture is being sprayed. Addition of a strong alkali can give almost instantaneous setting.

Addition of a gelling agent such as a borate can accelerate the gelling of the polymer. The rate of gelling can be adjusted by selecting a borate of suitable solubility. For example, calcium borate is less soluble than zinc borate and gives a longer gelling and therefore working time.

The advantages of this are that the mixing equipment does not need to be cleaned out periodically e.g. after every 2 to 3 mixes and continuous placers can be used.

The invention also provides a method of treating a rock surface in a mine which comprises spraying onto the surface a cementitious mixture and an organic polymer emulsion to form a film on the surface at least 2 mm in thickness. The coating may be applied to provide support. It has been found that a coating of about 4 mm (e.g. about 3 to 7 mm) in thickness may be used as a replacement for wire mesh employed to prevent spalling and loose rock fragments from falling in a mine e.g. mesh referred to in the USA as No 7 welded wire mesh. The coatings may be used in mines which are known as "hard rock mines" such as nickel or gold mines and also in coal mines.

The coatings may be used for example when mining coal by the room and pillar method to reduce the size of the pillars which are left to provide support and thereby recover more coal. This is achieved by spraying the coating onto the pillars thereby increasing their load bearing capability.

The coating may also be used to stabilise the ribs and for the repair and sealing of ventilation control structures. The coatings my also be applied to reduce or prevent weathering, that is the erosion of freshly exposed rock surfaces by air in the mine or for the suppression of radon gas in a uranium mine or for stabilising embankments for example in a quarry, for stabilising roofs of tunnels or the like. In WO 98/58886 the preferred cementitious composition is said to contain from 40 to 52% of ordinary Portland cement, 18 to 28% high alumina cement, and from 27 to 31% of anhydrite.

According to one aspect of the present invention compositions of much lower ordinary Portland cement content for example less than 20% have been found to be advantageous.

By accelerating the formation of ettringite and other aluminate hydrates it has been found that the support characteristics of No 7 mesh can be obtained in less than 24 hours. By forming large amounts of ettringite and other aluminate hydrates it has been found that the coating passes the US ASTM (E162) and Underwriters Laboratory of Canada CAN ULC S102 fire tests without the need for a chemical fire retardant.

Figure 2:
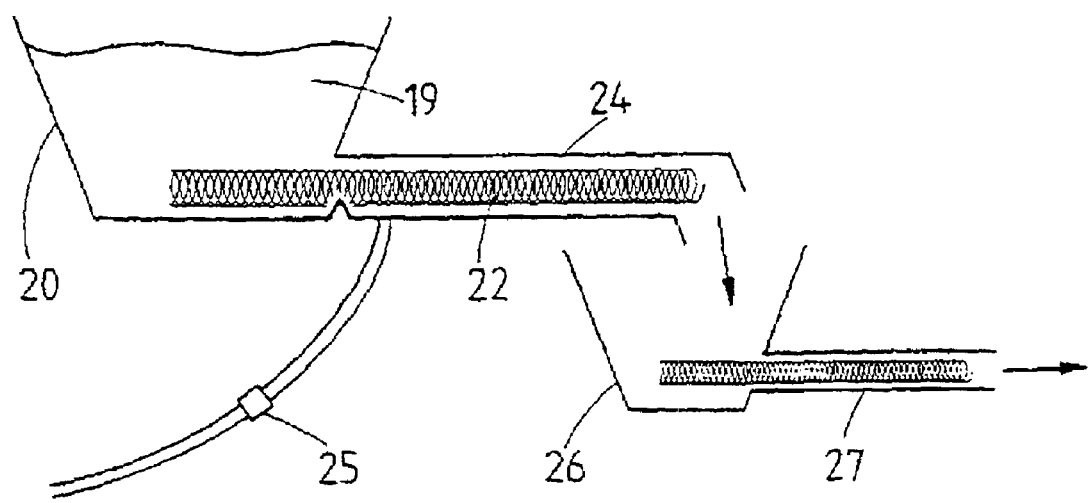

FIGS. 1 and 2 show the apparatus used in mixing and spraying to apply the coatings of the invention.

Referring to FIG. 1 three lines 2, 4 and 6 are connected to chamber 7 adjacent to a spray nozzle 8. Premixed emulsion/cement is supplied by line 2, air is supplied by line 4 where it is mixed with accelerator (if used) from line 6 before contacting the emulsion/cement mixture. A spray 10 comprising cement/emulsion, air and accelerator is emitted from the spray nozzle.

Referring to FIG. 2 dry powder 19 comprising cement and dried polymer emulsion is contained in hopper 20 from which it is withdrawn by a horizontal screw 22 into conduit 24. A controlled amount of water from a meter 25 is introduced into the conduit 24 and mixed with the powder by the action of the screw. From the conduit 24 the mixture is fed under gravity to a vessel 26 from which it is withdrawn by a Moyno pump 27 and then to a spray (not shown). The pump 27 is run faster than the mixture is fed to the vessel 26 so that the residence time in the vessel 26 is very short. Such an arrangement is known as a continuous placer. According to another aspect of the invention the above defined settable composition may be provided in the form of two slurries, which when mixed, provide the above defined settable composition.

The two slurries may comprise a first slurry containing calcium aluminate, calcium sulphate and polymer emulsion and a second slurry containing lime and polymer emulsion.

The first slurry may contain a retarder for the cement reaction and the second slurry may contain an accelerator for the cement reaction.

Substantially all the calcium aluminate and substantially all the calcium sulphate required to form the above defined settable composition may be provided in the first slurry and substantially all the lime may be contained in the second slurry. Each slurry contains sufficient polymer emulsion to provide mobility.

The invention is described by the following Examples.

The coatings obtained in all the following Examples achieved an adequate strength in less than 24 hours.

EXAMPLE 1

Preparation of Cementitious Composition

A cementitious composition was prepared containing the following:

| Component | parts by weight |
| --- | --- |
| Rockfast cement* | 50 |
| beta-anhydrite | 32 |
| ordinary Portland cement | 16 |
| lithium carbonate | 0.3 |
| polysaccharide anti bleed agent** | 0.6 |
| hydrated lime | 0.5 |
| nylon fibres*** | 0.1 |

The above components which are all dry powders were mixed in a tumble blender.
*Rockfast 450 was obtained as commercially available material from Blue Circle plc and contained about 60% by weight of calcium sulphoaluminate
**a water soluble polysaccharide biopolymer sold by Kelco International Ltd under the name Welan gum.
***hair-like fibres about 0.5 inches in length of the type known for cement reinforcement. These are added to improve build properties and tear resistance.

Addition of emulsion and application to mine wall for formation of high early strength coating The above composition was mixed with a polymer emulsion in the form of Elvace 735 (an ethylene vinyl acetate emulsion obtained from Reichhold and containing 54.5% by weight of polymer solids with a glass transition temperature $T_g$ of 0° C.) in the proportion of 2.5 parts by weight of emulsion to one of cement composition. The cement composition and the polymer emulsion were fed separately to a mixing vessel, then mixed for one minute and the mixture drawn from the mixing vessel by a progressive cavity pump e.g. a Moyno pump and passed to the apparatus shown in FIG. 1. The mixture was sprayed onto a rock surface in a mine to form a film on the surface about 4 mm in thickness. The mixture had a working time of about 30 minutes and passed the CANMET strength test for a No. 7 welded wire mesh screen (2.2 tonnes of load) at 4 hours.

EXAMPLE 2

Slow setting composition with addition of accelerator at the nozzle.

Preparation of Dry Powder

A dry composition was prepared containing the following:

| component | parts by weight* |
| --- | --- |
| dry ethylene vinyl acetate copolymer** | 625 |
| Rockfast 450 cement*** | 350 |
| citric acid (cement retarder) | 5 |
| lithium carbonate (accelerator) | 2.5 |
| ordinary Portland cement | 50 |
| zinc borate (gelling agent) | 5 |

*in pounds.
**A powdered polymer sold by Wacker Vinnapas under the designation RE 547Z having a glass transition temperature of −7° C. The powder had been obtained by spray drying an aqueous emulsion.
***Rockfast 450 from Blue Circle containing about 60% by weight of calcium sulphoaluminate The above components were mixed in a tumble blender and to the mixture water was added in an amount to give a water to solids weight ratio of 0.4 to 1 and mixed in an apparatus shown in FIG. 2.

The mixture so formed initially had a pH of about 5 to 6 and a setting time of several hours. The pH was raised to about 7 by the addition of saturated sodium carbonate solution at the spraying nozzle. At the same time lime was liberated from the ordinary Portland cement and this also has the effect of raising the pH. The purpose of raising the pH to at least 7 was to stimulate the setting of the cement and promote the gelling of the polymer.

The resulting mixture had a setting time of about 20 to 30 seconds.

The mixture is applied to the roof of a mine by spraying to give a film thickness of about 4 mm.

In view of the extremely short gel time mentioned above the coating gives some support almost instantaneously. It also has very good build properties and can be used at very high humidities egg a relative humidity of greater than 95%.

By adjustment of the pH and borate concentration it is possible to control the gelling time and thereby extend the working time of the mixture to at least one hour. An advantage of the dried polymer emulsion is that it is frost resistant.

EXAMPLE 3

High Early Strength with Tire Retardant Properties

A cementitious composition containing the following components was prepared:

| component | parts by weight |
| --- | --- |
| high alumina cement | 49.24 |
| lithium carbonate | 0.1 |
| nylon fibers | 0.1 |
| citric acid | 0.12 |
| polysaccharide | 0.69 |
| hydrated lime | 0.49 |
| ordinary Portland cement | 16.41 |
| beta-anhydrite | 32.85 |

The above components were mixed in a tumble blender.

The mixture thereby formed was mixed with 2.5 times its own weight of Elvace 735 emulsion (54.5% solids) and sprayed onto the roof of a nickel mine to provide a coating of about 4 mm in thickness.

The coating which contained a large proportion of Ettringite, was tested and found to meet the US fire retardant test ASTM (E162) and the Underwriters Laboratory of Canada test CAN ULC S102. This is an advantage over prior art compositions which require the addition to a chemical fire retardant to the composition. The coating had a strength equivalent to No 7 mesh screen at 8 hours.

EXAMPLE 4

A dry powder containing the following components was prepared:

| component | parts by weight. |
| --- | --- |
| dried ethylene vinyl acetate copolymer* | 62 |
| Rockfast 450 | 21 |
| beta-anhydrite | 7 |
| ordinary Portland cement | 9 |
| lithium carbonate | 0.2 |
| citric acid | 0.2 |
| calcium borate powder** | 0.5 |

*Vinnapas RE 547Z from Wacker having a $T_g$ of −7° C.
**colemanite which is $Ca_3B_6O_{11} \cdot 5H_2O$ a hydrated borate mineral.

The powder was blended with water using the apparatus shown in FIG. 2 to provide a water to solids ratio of 0.5 and sprayed onto a rock surface to produce a coating about 4 mm in thickness.

The mixture had a working life of 1 hour 40 minutes but gained strength rapidly once set.

When the Example was repeated with no borate added, the working life was greater than 3 hours.

When it was repeated with the addition of sodium borate it was found that the working life became very short. This shows that the length of the working life can be controlled by choice of a borate of suitable solubility.

In addition a very soluble borate such as sodium borate or boric acid may be added at the nozzle or a borate of lower solubility e.g. calcium borate may be added at the mixing of the components.

EXAMPLE 5
Preparation of Dry Powder

A dry composition was prepared containing the following:

| | % by weight |
| --- | --- |
| Elvace 785 powder EVA | 18.47 |
| Wacker RP547Z powder EVA | 43.32 |
| Rockfast 450 CSA cement | 23.09 |
| Beta-anhydrite | 9.84 |
| Ordinary Portland Cement | 4.62 |
| Citric acid | 0.05 |
| Lithium carbonate | 0.23 |
| Colemanite | 0.61 |
| Polysaccharide | 0.74 |
| Fibers | 0.03 |
| Calcium hydroxide | none |

The above components were mixed in a tumble blender and employed as described in Example 2

EXAMPLE 6
Preparation of Dry Powder

A dry composition was prepared containing the following:

| | % by weight |
| --- | --- |
| Elvace 785 powder EVA | 48.38 |
| Wacker 245 powder EVA | 19.69 |
| Secar 51 high alumina cement | 19.23 |
| Beta-anhydrite | 5.11 |
| Ordinary Portland Cement | 4.81 |
| Citric acid | 0.02 |
| Lithium carbonate | 0.20 |
| Colemanite | 0.51 |
| Polysaccharide | 1.53 |
| Fibers | 0.01 |
| Calcium hydroxide | 0.31 |

The components were mixed in a tumble blender and applied as described in Example 2.

EXAMPLE 7

This example describes the formation of a coating by mixing two slurries together.

Each slurry was made up of a powder formulation and a liquid emulsion. A spray dried polymer may be substituted for the liquid emulsion in which case it will be necessary to add water in the required amount.

This Example has the advantage over Examples 1 to 4 in that each slurry can have a long pot life thus enabling large batches or many batches to be made without cleaning the mixing equipment.

Once the two slurries are brought together a rapid set is obtained. This may be done in an in-line static mixer to enable rapid output of material.

The two slurries contained the following components. Parts are by weight.

| Slurry 1 | | Slurry 2 | |
| --- | --- | --- | --- |
| High alumina cement | 60 | Elvace 735 | 50 |
| Beta-anhydrite | 40 | lithium carbonate | 0.3 |
| Polysaccharide | 0.75 | lime | 3 |
| Elvace 735 | 200 | polysaccharide | 0.2 |
| Citric acid (to adjust pot life) | 0 to 0.3 | | |

The two slurries were mixed together in the above proportions in a static mixer. The set time was 10 to 15 minutes.

Tensile strength at one day was 170 psi and the tensile strength at 28 days was 620 psi.

A feature of the above Example is the long pot life of the slurries which is greater than about 2 hours.

What is claimed is:

1. A settable composition comprising:
   (i) a cementitious composition comprising the following components:
      (a) from 25 to 95% of calcium aluminate,
      (b) from 0 to 10% of lime, and
      (c) from 0 to 50% of calcium sulphate, and
      where the sum of (b) and (c) is at least 5%, the % being by weight based on the combined weight of (a), (b) and (c) and where the proportions of the components are such that the composition on hydration is capable of absorbing at least its own weight of water, and
   (ii) an aqueous emulsion of an organic polymer, the amount of (ii) in relation to (i) being such as to provide a weight ratio of polymer solids to combined weight of (a), (b) and (c) of from 0.5:1 to 10:1, or
   (iii) a dispersible organic polymer and where the amount of dispersible polymer is such as to give a weight ratio of polymer to combined weight of (a), (b) and (c) of from 0.5:1 to 10:1.

2. A settable composition as claimed in claim 1, wherein the amount of water is equal to at least 50% by weight of the weight of the cementitious composition (i).

3. A dry composition as claimed in claim 1, comprising said cementitious composition (i) and said dispersible organic polymer (iii) and further comprising a gelling agent for the polymer.

4. A dry composition as claimed in claim 3 wherein the gelling agent is a borate.

5. A method of applying a coating to a surface which method comprises forming a mixture of a cementitious composition (i) and an aqueous emulsion (ii) as defined in claim 1 in amounts such that the amount of water is at least equal to 50% by weight of the cementitious composition (i) and spraying the mixture onto the surface to form a coating at least 2 mm in thickness.

6. A method of applying a coating to a surface which method comprises forming a mixture of a cementitious composition (i) and a dispersible organic polymer (iii) as defined in claim 1 combining the mixture with an amount of water equal to at least 50% by weight of the cementitious composition (i) and spraying the mixture onto the surface to form a coating at least 2 mm in thickness.

7. A method as claimed in claim 6 wherein a gelling agent such as a borate is included to promote gelling of the polymer and wherein the working time of the mixture is controlled by adjusting the solubility of the gelling agent.

8. A method as claimed in claim 6 wherein the rate of setting is controlled by adjusting the pH by the addition of an alkali or acid.

9. Two slurries which when mixed together provide a settable composition as in claim 1.

10. Two slurries as claimed in claim 9 wherein a first slurry comprises calcium aluminate, calcium sulphate and polymer emulsion and a second slurry comprises lime and polymer emulsion.

11. Two slurries as claimed in claim 10 wherein the first slurry contains a retarder for the cement reaction.

12. Two slurries as claimed in claim 10 wherein the second slurry contains an accelerator for the cement reaction.

13. A method as claimed in claim 7 wherein the rate of setting is controlled by adjusting the pH by the addition of an alkali or acid.

14. Two slurries which when mixed together provide a settable composition as claimed in claim 2.

15. Two slurries as claimed in claim 11 wherein the second slurry contains an accelerator for the cement reaction.

16. A settable composition as claimed in claim 1, wherein the weight ratio of either (ii) or (iii) is 1:1 to 2.5:1.

17. A settable composition as claimed in claim 2, wherein the amount of water is from 70% to 250% by weight of the weight of the cementitious composition (i).

18. A settable composition as claimed in claim 5 or 6, wherein the amount of water is between 70% to 250% by weight of the cementitious composition (i).

* * * * *